(12) United States Patent
Woo et al.

(10) Patent No.: US 9,701,210 B2
(45) Date of Patent: Jul. 11, 2017

(54) COOLING OF CHARGING CABLE

(71) Applicant: Tesla Motors, Inc., Palo Alto, CA (US)

(72) Inventors: Yee Shan Woo, Hillsborough, CA (US); Christopher H. Van Dyke, San Francisco, CA (US); Joseph Mardall, San Francisco, CA (US); Christopher Newport, San Jose, CA (US); Joshua Willard Ferguson, Alameda, CA (US)

(73) Assignee: TESLA, INC., Palo Alto, CA (US)

( * ) Notice: Subject to any disclaimer, the term of this patent is extended or adjusted under 35 U.S.C. 154(b) by 0 days.

(21) Appl. No.: 15/076,432

(22) Filed: Mar. 21, 2016

(65) Prior Publication Data

US 2016/0200206 A1    Jul. 14, 2016

Related U.S. Application Data

(63) Continuation of application No. 14/173,757, filed on Feb. 5, 2014, now Pat. No. 9,321,362.

(51) Int. Cl.
| | | |
|---|---|---|
| *B60L 11/18* | (2006.01) | |
| *H02J 7/00* | (2006.01) | |
| *H01B 9/00* | (2006.01) | |
| *H01B 7/42* | (2006.01) | |

(52) U.S. Cl.
CPC ......... *B60L 11/1818* (2013.01); *B60L 11/185* (2013.01); *B60L 11/1824* (2013.01); *H02J 7/0029* (2013.01); *B60L 2230/12* (2013.01); *H01B 7/423* (2013.01); *Y02T 10/7005* (2013.01); *Y02T 90/121* (2013.01); *Y02T 90/128* (2013.01); *Y02T 90/14* (2013.01)

(58) Field of Classification Search
CPC ..... B60L 11/1818; H02J 7/0029; H01B 7/423
USPC .......................................................... 320/109
See application file for complete search history.

(56) References Cited

U.S. PATENT DOCUMENTS

| | | | | |
|---|---|---|---|---|
| 2,549,264 | A * | 4/1951 | Timmins ................ | H01B 9/001 174/15.7 |
| 3,021,380 | A * | 2/1962 | Barrass .................. | H01B 9/001 174/15.7 |
| 3,851,092 | A * | 11/1974 | Talley .................... | H01B 9/001 174/15.7 |
| 5,306,999 | A * | 4/1994 | Hoffman ............. | B60L 11/1818 320/109 |
| 5,670,860 | A * | 9/1997 | Conrady ............... | H02J 7/0042 174/15.6 |
| 5,909,099 | A * | 6/1999 | Watanabe ............ | A61K 31/726 320/108 |
| 6,220,955 | B1 * | 4/2001 | Posa ..................... | F21S 48/325 454/184 |
| 6,396,241 | B1 * | 5/2002 | Ramos ................ | B60L 11/1816 174/47 |
| 9,061,597 | B2 * | 6/2015 | Oda .................... | B60L 11/1825 |

(Continued)

*Primary Examiner* — Sun Lin
(74) *Attorney, Agent, or Firm* — Garlick & Markison; Bruce E. Garlick

(57) ABSTRACT

A charging system for an electric vehicle includes: a power supply; a cable having first and second ends, the first end attached to the power supply, the cable comprising a charging conductor and a cooling conduit, each of which extends from the first end to the second end; and a connector attached to the second end of the cable, the connector having a form factor corresponding to a charge port of the electric vehicle; wherein the cooling conduit is adapted to convey a fluid that cools the charging conductor.

20 Claims, 11 Drawing Sheets

(56) References Cited

U.S. PATENT DOCUMENTS

| | | | |
|---|---|---|---|
| 9,321,362 B2* | 4/2016 | Woo | B60L 11/1818 |
| 2010/0045233 A1* | 2/2010 | Alameh | F03D 9/00 |
| | | | 320/114 |
| 2013/0307477 A1* | 11/2013 | Reinschke | B60L 11/1816 |
| | | | 320/109 |
| 2013/0337705 A1* | 12/2013 | Kalayjian | H01R 9/0518 |
| | | | 439/889 |
| 2014/0247018 A1* | 9/2014 | Kikuchi | H02J 7/0029 |
| | | | 320/150 |
| 2014/0347017 A1* | 11/2014 | Sugano | B60L 1/003 |
| | | | 320/137 |

* cited by examiner

COOLING OF CHARGING CABLE

CROSS-REFERENCE TO RELATED APPLICATION

This application is a continuation of U.S. patent application Ser. No. 14/173,757, filed Feb. 5, 2014, co-pending, now issued as U.S. Pat. No. 9,321,362, and entitled COOLING OF CHARGING CABLE, the contents of which are incorporated herein by reference.

BACKGROUND

The advancement of electric vehicles has created an increased need for charging equipment that delivers electric power. Some such applications (e.g., certain fast-charging vehicle chargers) are designed to work with continuous currents of 100 Amps or more. Generally, the higher the current flow in a certain conductor the more heat is generated. As a result, the conductors between the charging equipment and the vehicle have traditionally been sized larger to match the higher current draws.

SUMMARY

In a first aspect, a charging system for an electric vehicle comprises: a power supply; a cable having a first end and a second end, the first end attached to the power supply, the cable comprising a charging conductor and a cooling conduit, each of which extends from the first end to the second end; and a connector attached to the second end of the cable, the connector having a form factor corresponding to a charge port of the electric vehicle, wherein the connector includes a fluid hub that has an inlet opening and an outlet opening; wherein the cooling conduit is adapted to convey a fluid that cools the charging conductor and the connector.

Implementations can include any or all of the following features. The connector further includes contacts for electrical connection to the electric vehicle, and the contacts are held by the fluid hub. The contacts are essentially cylindrical, and the fluid hub is shaped to receive and hold the essentially cylindrical contacts. The fluid hub comprises a housing configured to be closed by a cap. The inlet opening and the outlet opening are positioned on the cap. The connector further includes contacts for electrical connection to the electric vehicle, and a fluid channel that surrounds at least part of the contacts. The fluid channel is coupled to the fluid hub. The coupling is done via an interior of the fluid hub. The fluid channel defines a spiral shaped flow pattern. The connector further includes contacts for electrical connection to the electric vehicle, the contacts having corresponding busbars, and wherein each of the busbars is positioned against a substantially flat face of the fluid hub. Each of the busbars is jogged relative to the corresponding contact. The fluid hub defines a single interior fluid path from the inlet opening to the outlet opening. The single interior fluid path makes a U-turn between the inlet opening and the outlet opening. The fluid hub comprises two halves attached to each other. Each of the inlet opening and the outlet opening is positioned on a respective one of the two halves. A wall enclosed within an interior of the fluid hub defines an interior fluid path from the inlet opening to the outlet opening. The wall is formed by corresponding pieces on the respective two halves. The inlet opening and the outlet opening are staggered from each other horizontally and vertically on a common face of the fluid hub. The charging system further comprises circuit components mounted onto the fluid hub. The charging system further comprises a ground cable that extends from the first end to the second end and is touching the charging conductor and the cooling conduit, wherein the ground cable is adapted to conduct heat from the charging conductor to the cooling conduit.

DETAILED DESCRIPTION

This document describes examples of systems and techniques for cooling charging cables. The charging cable that gets connected to the charge port of an electric vehicle can be cooled by a fluid. This can provide one or more advantages, such as: more electric power can be fed through the charging cable; a thinner charging cable can be used; the charging cable can be made lighter; less copper can be used in the charging cable; and/or the charging cable can be made more flexible and therefore easier to handle. While electric vehicles are mentioned in examples herein, some implementations can instead or in addition be used in one or more other contexts, including charging of stationary storage installations. Also, while charging is described in examples herein, some implementations can instead or in addition be used with transfer of electric energy in other contexts, such as when attaching an electric device to a power supply. Finally, connectors described in examples herein can be either male or female connectors.

Figure 1:
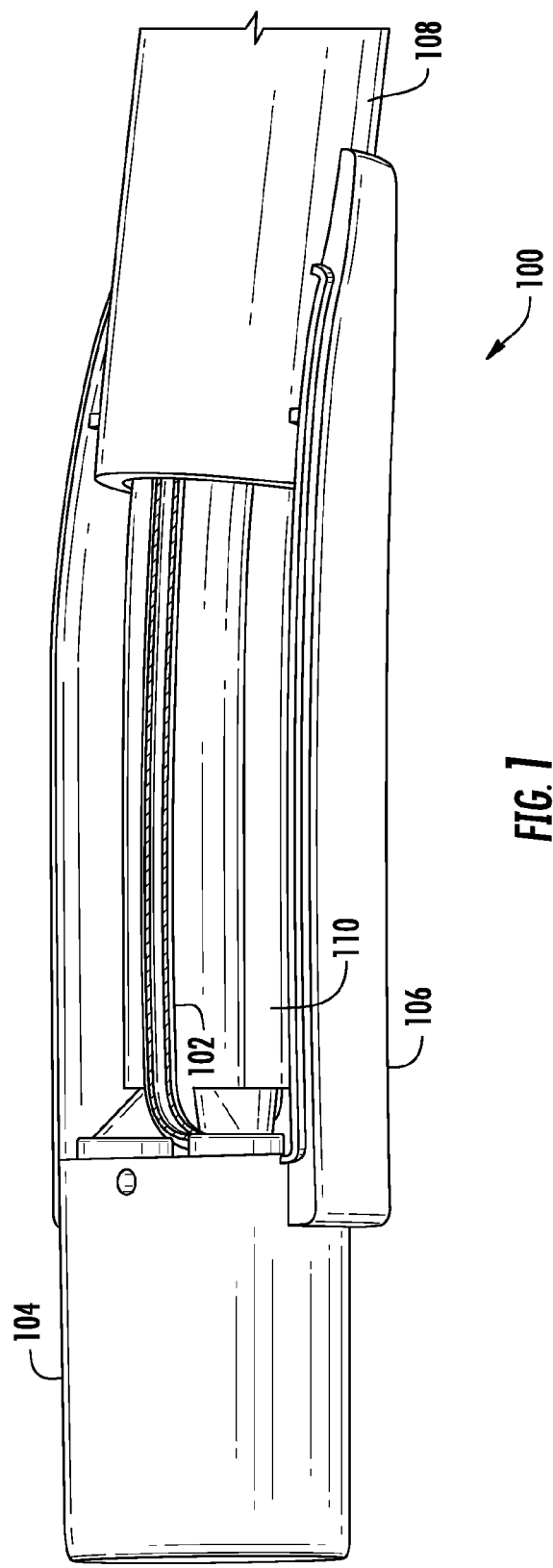
FIG. 1 shows an example of a charging cable having a cooling conduit.

FIG. 1 shows an example of a charging cable 100 having a cooling conduit 102. Generally, the charging cable has a connector 104, a connector housing 106 (part of which is here removed for visibility) and a cable 108. The connector 104 is designed so as to be compatible with a charging inlet (e.g., a receptacle) installed on an electric vehicle, and may therefore be configured according to one or more standards for electric connectors. The connector housing 106 is designed to be held by a person, such as when inserting the connector into a vehicle charge port, and when removing the connector from the charge port after charging. The cable 108 forms the connection between the connector 104 and charging equipment (not shown), and houses not only the cooling conduit 102 but also at least one charging conductor 110 that is configured for delivering electric power. In some implementations, the connector and the connector housing can be manufactured as a single piece.

The cooling conduit 102 serves to convey a coolant (e.g., a liquid) along the length of the charging conductor so as to remove some or all heat generated by the flow of electric energy. Examples of coolants or other heat transfer mediums include, but are not limited to, water, air, oil, phase-changing materials, and other chemicals. For example, a non-degrading coolant can be chosen that has sufficient heat capacity. The material for the cooling conduit can be chosen based on its thermal conductivity and on its flexibility and durability. Here, the cooling conduit starts at the beginning of the cable 108 (not shown), and doubles back near the connector 104. With this and similar implementations, the conduit can provide cooling along essentially the entire length of the cable 108 and within the charging connector.

In some implementations, the coolant reverses flow direction at or near the connector, for example by way of a U-turn in the cooling conduit 102. As such, the coolant can be returned to the system that provides the coolant, such as a reservoir of a cooling system for the particular charging station to which the charging cable is attached. As another example, the U-turn can occur outside of the charging connector, such as in an implementation where coolant is fed into a vehicle (e.g., during charging) so as to provide (or enhance) cooling during the charging operation, wherein the coolant passes back out of the vehicle through the same charging connector. In other implementations, a one-way flow of coolant can be provided. For example, the connector that attaches to the charging inlet of an electric vehicle (or other equipment) can also have a fluid inlet that is coupled to a coolant reservoir of the vehicle. As such, the coolant can be used to replenish coolant in such reservoir.

Figure 2:
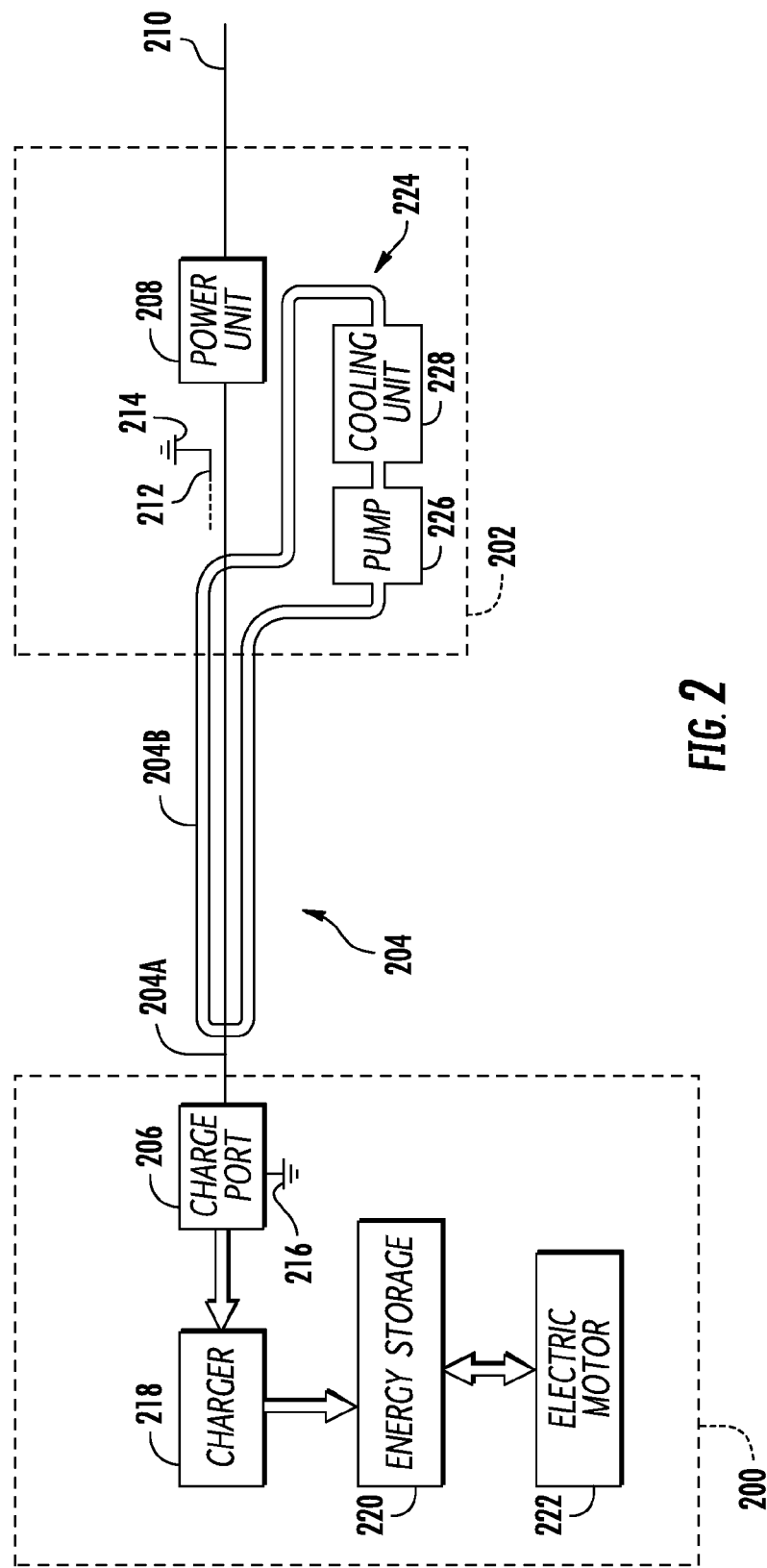
FIG. 2 shows an electric-vehicle system connected to a charging system.

FIG. 2 shows an electric-vehicle system 200 connected to a charging system 202. For example, the system 200 can be part of an electric vehicle (e.g., a fully electric passenger vehicle) and the system 202 can be part of charging equipment designed for one or more types of electric vehicles (e.g., electric-vehicle supply equipment installed at a private or public location). A charging cable 204 is schematically illustrated that connects the two systems. For example, one end of the charging cable is permanently attached to the system 202 and at the time of charging a user attaches the other end to a charge port 206 that is part of the electric vehicle. The charging cable includes one or more electric conductors 204A (e.g., a copper wire) and a cooling conduit 204B.

The electric conductor 204A receives electric power from a power unit 208 within the system 202, which in turn draws electricity from an external power supply 210, such as from a generator or an electric grid. In some implementations, the power unit conditions the supplied power so as to deliver the proper electric energy to the electric vehicle. For example, incoming AC or DC can be converted to a suitable form of AC or DC. The electric conductor can have a ground conductor 212 along some or all of its length, which can be connected to a ground terminal 214 in the system 202. During charging, the ground conductor can also be connected to a corresponding ground terminal 216 in the electric vehicle, such as to the vehicle chassis.

In the electric-vehicle system 200, the power conveyed by the charging cable 204 is provided to at least one onboard charger 218 which feeds electric energy into an energy storage 220 (e.g., a battery pack of lithium-ion cells). Such stored energy can be used by one or more electric motor 222 and/or another vehicle component, such as for propulsion and/or heating of the electric vehicle. In some implementations, the energy storage can receive electric energy in at least one other way in addition to the charger 218, including by regeneration of kinetic energy from a moving vehicle.

Returning now to the cooling conduit 204B, it is part of a cooling system 224 based in the charging system 202. For example, the cooling system can be contained within the same cabinet or housing as the supply equipment. In this implementation, a pump 226 receives coolant returning from the charging cable 204 and feeds the coolant to a cooling unit 228, which can make use of any cooling technique that is suitable considering the level of heat involved. For example, a radiator (e.g., one or more heat fins) can be used, optionally in combination with a fan. From the cooling unit, the cooled fluid is fed to the inlet of the charging cable, where it cools the charging conductor and any connector at the end of the cable. The dimensions of the cooling conduit, and the flow rate of the coolant, are selected based on the characteristics of the implementation.

In other implementations, more than one conduit, pump, and/or cooling unit, can be used. As another example, the coolant can flow in the opposite direction in the circuit. In yet another implementation, the coolant does not circulate but rather is conveyed from the charging system 202 to the electric-vehicle system 200. For example, the electric-vehicle system can contain a reservoir of coolant that is replenished by the supply from the charging system.

Figure 3:
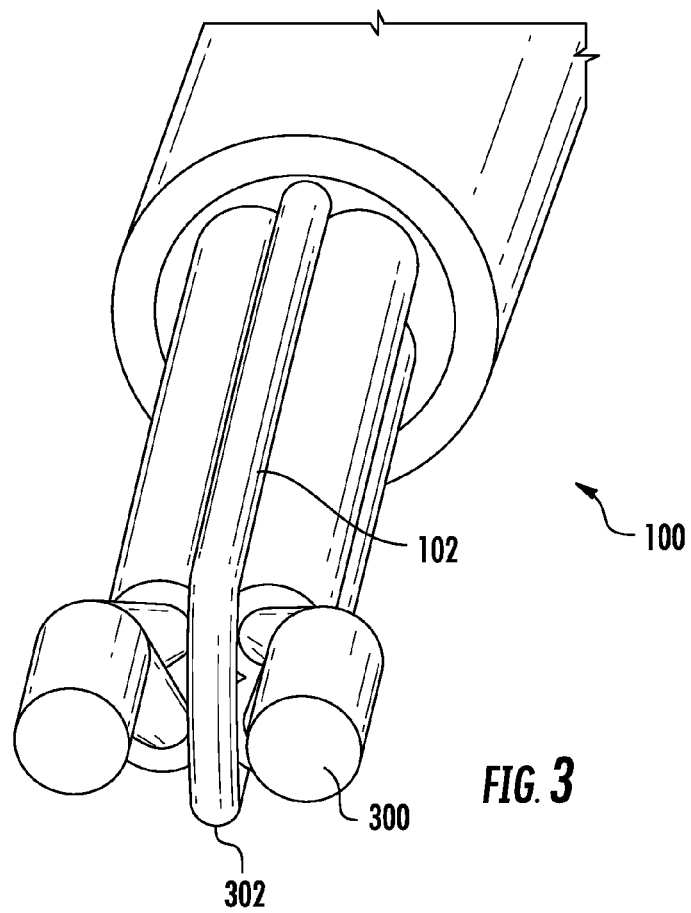
FIG. 3 shows an example of a cooling conduit with a U-turn loop.

FIG. 3 shows an example of a cooling conduit with a U-turn loop. Particularly, the charging cable 100 is here shown with copper-based terminals 300 (i.e., the ends of the charging conduits, which can be made of copper, brass or some other copper alloy, to name a few examples). The cooling conduit 102 loops back between the copper terminals by way of a U-turn component 302. That is, the material of the cooling conduit is sufficiently flexible that it can be bent, without breaking, into the illustrated shape. For example, this flexibility exists under normal conditions (e.g, at room temperature), or it is brought about by treatment of the conduit (e.g., by heating, forming, molding or fabrication). In other implementations, the cooling conduit can be routed around a curved portion of an armature. For example, this can prevent possible kinks which could restrict coolant flow.

In some examples described herein, the coolant makes a U-turn upon reaching the charging connector and thereafter returns back along the charging cable (e.g., in a circulatory system). In other implementations, however, the charging cable can serve as a "pass-through" for fluid (e.g., coolant) into the vehicle or other equipment being charged. For example, this can be used for providing coolant/fluid to a vehicle's internal cooling system.

Figure 4:
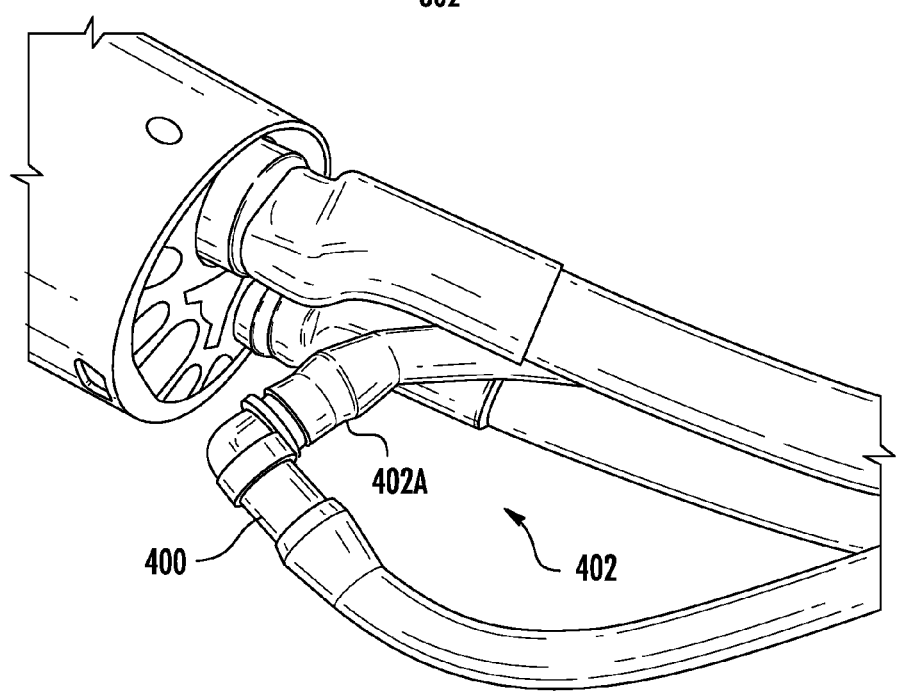
FIG. 4 shows an example of a cooling conduit with a connecting piece.

FIG. 4 shows an example of a cooling conduit with a connecting piece 400. That is, a cooling tube 402 can consist of an inlet portion 402A and an outlet portion 402B. The inlet portion extends from the beginning of the charging cable until its end where it is coupled to the connecting piece. Similarly, the outlet portion extends from the connecting piece to the beginning of the charging cable. The connecting piece can have any suitable form, including, but not limited to, a knee shape. For example, the connecting piece can allow the cooling conduit to loop back within a closer confine (e.g., within a narrower cable housing) than what would be possible or practical when making a U-turn of the conduit material itself.

Figure 5:
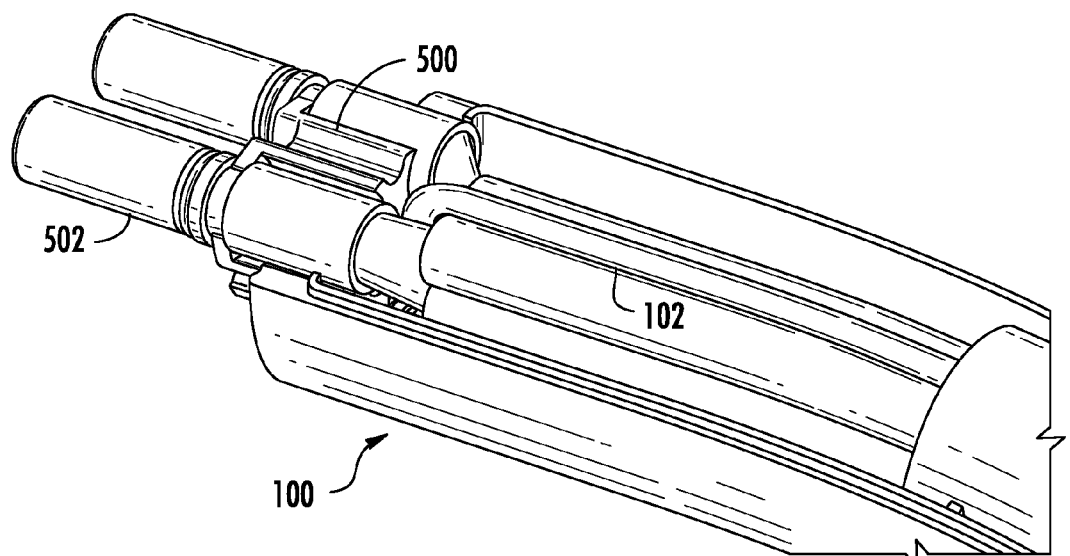
FIG. 5 shows an example of a charging cable connector with an armature and a cooling conduit.

FIG. 5 shows an example of the charging cable connector 100 with an armature 500 and the cooling conduit 102. Particularly, part of the connector that was shown in FIG. 1 has here been removed so that electric contacts 502 are visible. The electric contacts will mate with corresponding contacts in the charge port of the electric vehicle so as to provide an electric connection for the charging. The armature 500 can be manufactured from any suitable material (e.g., a plastic material) and can have a design that allows it to hold the electric contacts. The cooling conduit 102 loops back between the copper terminals, similar to the example above.

During the charging process, heat is generated not only along the length of the electric conductors (i.e., within the copper or other material they are made from) but also within the connector (i.e., within the electric contact 502 and/or at the juncture between the conductor and the contact). In some implementations, significant heat is generated within or near the connector and a substantial need for cooling in this region can therefore exist. Such cooling can be provided by the loop of the cooling conduit which increases the amount of coolant being circulated near the generated heat.

Figure 6:
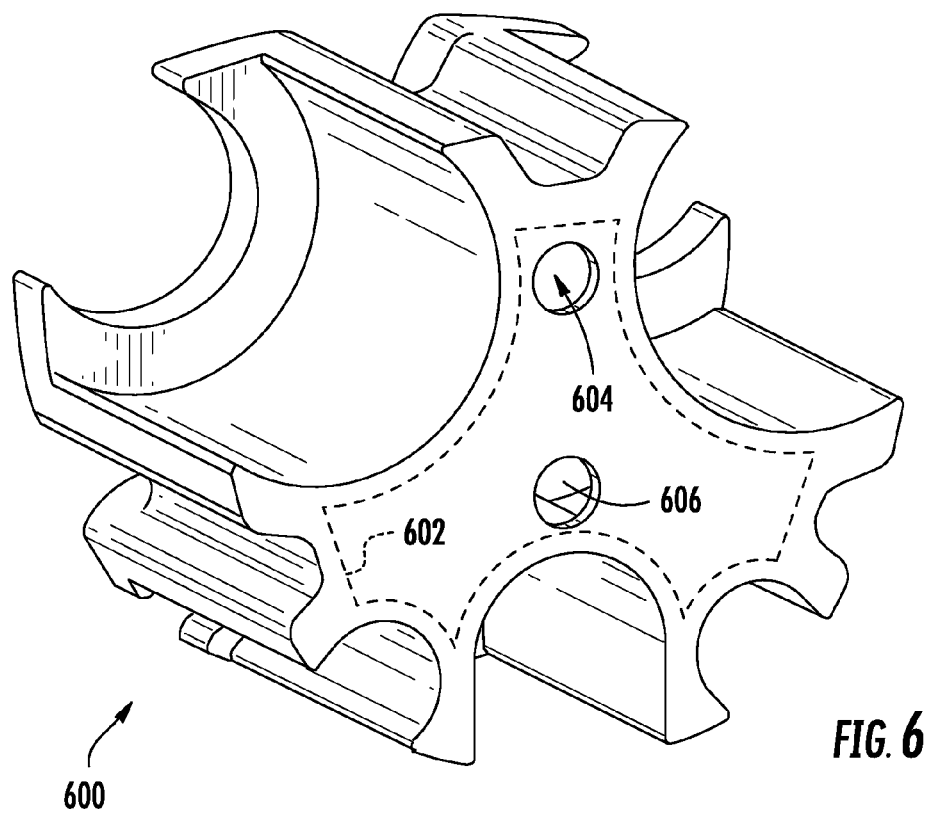
FIG. 6 shows an example of an armature having an interior cavity.

In some implementations, another approach can be used to cool the connector and to provide the coolant into the outlet portion of the conduit. FIG. 6 shows an example of an armature 600 having an interior cavity 602. The armature 600 can be configured for use with the charging cable 100 (e.g., FIG. 5) and can provide the additional benefit of internal cooling. The interior cavity 602 extends through some or all of the interior of the armature and can have any suitable shape (such as, the shown shape). In some implementations, the armature is made by a machine fabrication or molding process, including, but not limited to, injection molding.

The armature 600 has at least one inlet 604 providing entry for the coolant into the interior cavity 602, and at least one outlet 606 providing exit therefrom. With reference again briefly to FIG. 4 as an example, the inlet portion 402A can be coupled to the inlet 604, and the outlet portion 402B can be coupled to the outlet 606. Accordingly, an at least partially hollow interior of the armature 600 can provide circulation of coolant therein, which serves to remove heat generated in the charging.

In other implementations, a thermal filler material can be provided between one or more of the contacts 502 (FIG. 5) and the armature. For example, this can increase thermal transfer and thus improve the cooling.

The armature can provide important advantages in the manufacturing of the charging cable. First, the connections for electricity (i.e., the conductors) and for coolant (i.e., the cooling conduit) can be made. Next, the electric contacts (e.g., contacts 502 in FIG. 5) can be inserted into the armature so that they are held by it. Then, the forward ends of the contacts (i.e., the ends facing toward the vehicle when used) can be inserted into a fixture so they are held in the correct position. For example, such fixture can correspond to the charge port with which the charging cable should be used. While the contacts are being held, potting or other material can be applied on or around the contacts so as to lock them into their correct positions. For example, the potting material can be thermally conductive. That is, the armature can serve to orientate the electric contacts into their correct positions, structurally support the contacts during use (e.g., when inserting or removing the connector from the vehicle), and provide cooling at the point where significant heat is generated.

Figure 7:
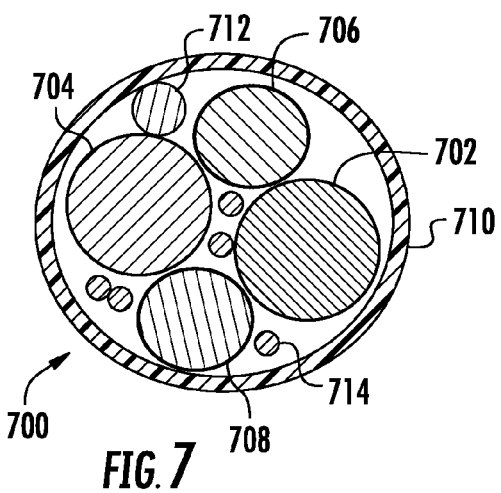
FIGS. 7-9A show examples of cross section profiles for charging cables.
Figure 8:
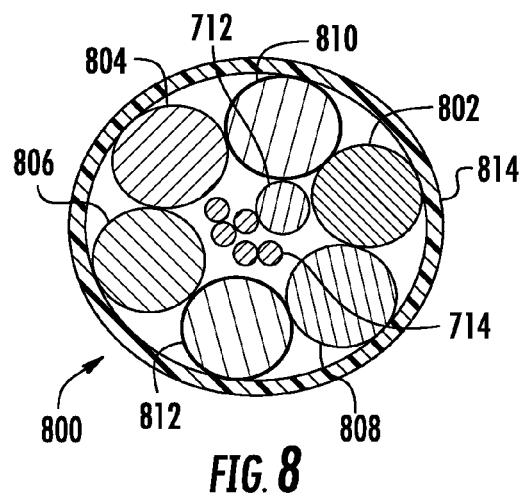
Figure 9:
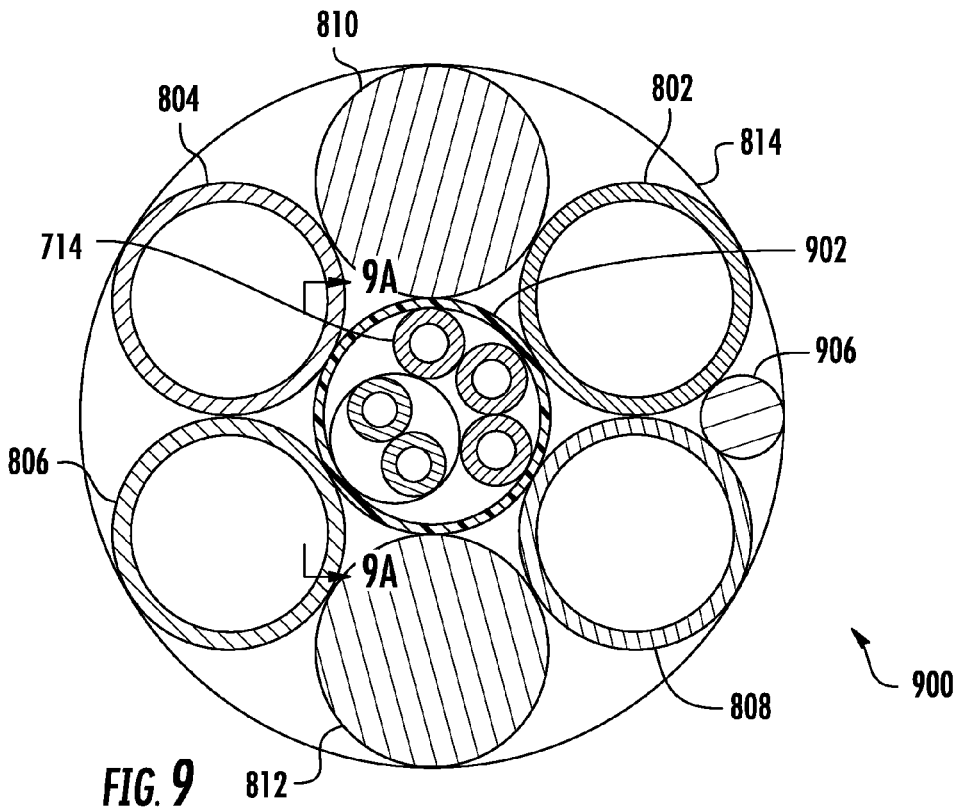

FIGS. 7-9 show examples of cross section profiles for charging cables. A profile 700 includes electric conductors 702 and 704, and cooling conduits 706 and 708, inside an outer jacket 710. The electric conductors can have one or more insulating materials on the outside to provide electric insulation. Each of the cooling conduits has one or more channels inside to allow coolant to flow in at least one direction. Generally, the cooling provided by the cooling conduits allows the charging cable to be made with a smaller diameter of the outer jacket than otherwise. Also inside the cable are ground conductor 712 and one or more additional members 714, such as signal cables and/or filler material. The cable components are shown with a certain separation from each other for clarity, with the understanding that the components could completely fill the interior of the outer jacket in some implementations.

Here, each of the cooling conduits 706 and 708 is touching each of the electric conductors 702 and 704. Accordingly each of the cooling conduits is capable of providing cooling to each of the electric conductors.

A profile 800 includes electric conductors 802, 804, 806 and 808, and cooling conduits 810 and 812, inside an outer jacket 814. The ground conductor 712 and the additional member(s) 714 can also be included within the outer jacket. Each of the cooling conduits has one or more channels inside. Here, the cooling conduit 810 is touching each of the electric conductors 802 and 804, and the cooling conduit 812 is touching each of the electric conductors 806 and 808.

Figure 9A:
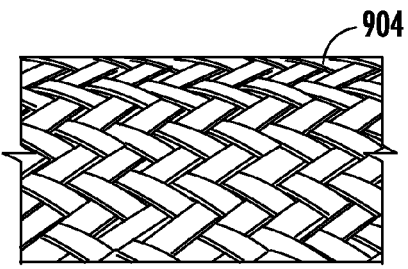

In a profile 900, the outer jacket 814 contains the electric conductors 802, 804, 806 and 808, and the cooling conduits 810 and 812. Signal cables (e.g., the additional members 714) are enclosed within a ground conductor 902. An outer surface 904 of the ground conductor can be braided, for example as illustrated in the cross section shown in FIG. 9A. In some implementations, a thin layer of an insulating material (e.g., plastic) can be provided between the ground cable and one or more other components. One or more filler members 906 can be provided inside the outer jacket.

The ground conductor can be in contact with each of the electric conductors 802, 804, 806 and 808, and the cooling conduits 810 and 812. Accordingly, the ground conductor can allow heat to be transferred from the electric conductors to the cooling conduits and thereby increase the efficiency of the cooling.

In the examples herein, the dimensions and proportions of individual cable components, the numbers of components and their respective positions relative to each other are all for illustrative purposes only. In other implementations, the dimensions, proportions, number of components and/or relative positions can be different. For example, the cross sectional shape of the conduit could be optimized to maximize surface area contact with the conductors to increase thermal transfer.

FIGS. 10A-D show other examples of an armature 1000 and electric contacts 1002. The armature has a housing 1000A with a shape that forms a cavity 1000B on the inside and one or more contact spaces 1000C on the outside. A cap 1004 has a shape that seals off the cavity, for example by tracing the profile of the contact space(s). In some implementations, the cap has two fittings 1006 that allow coolant or other fluid to pass into and out of the interior of the armature. For example, the cooling conduit 102 (FIGS. 1, 3, 4, 5) can be attached to the cap to provide coolant circulation inside the armature.

Figure 10A:
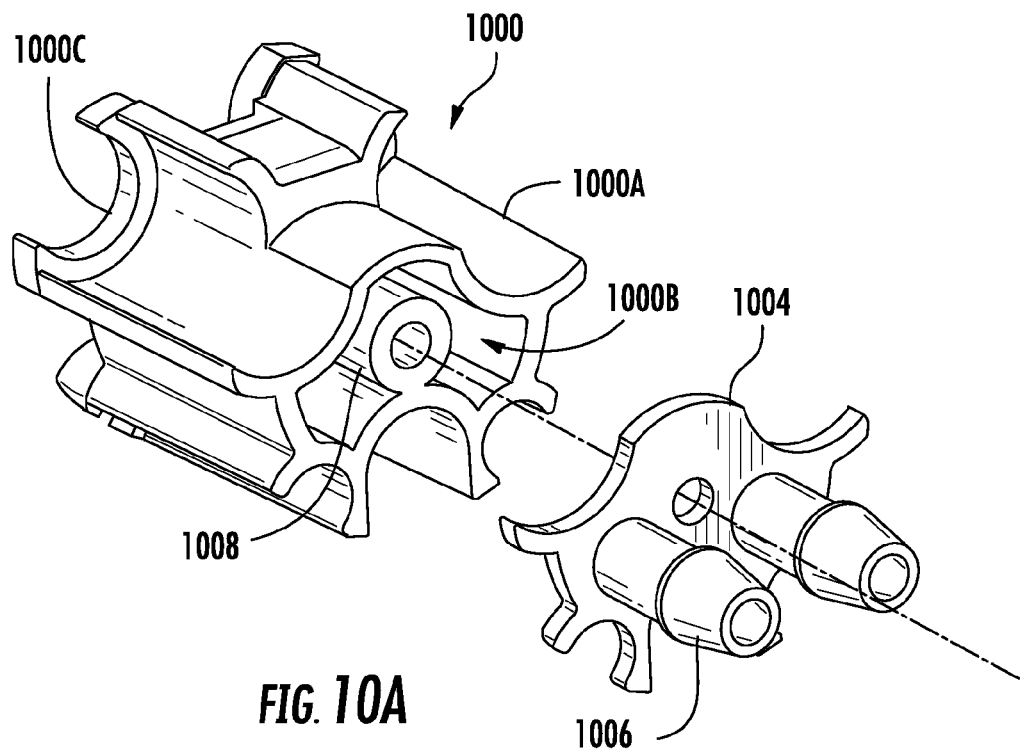
FIGS. 10A-D show other examples of an armature and electric contacts.
Figure 10B:
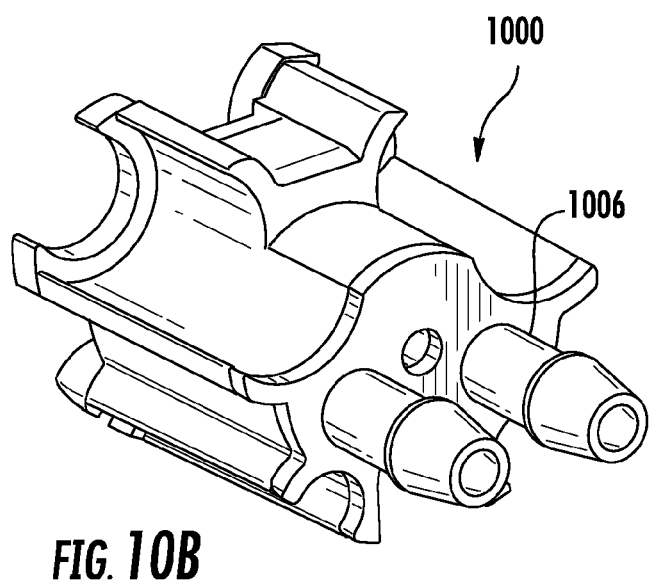

A structure 1008 can provide for attachment of the cap 1004 onto the housing 1000A. For example, one or more bolts or other fasteners can be used. In some implementations, the joint can be sealed, such as by a gasket or potting material. FIG. 10B shows the armature 1000 with the cap 1004 in place.

Figure 10C:
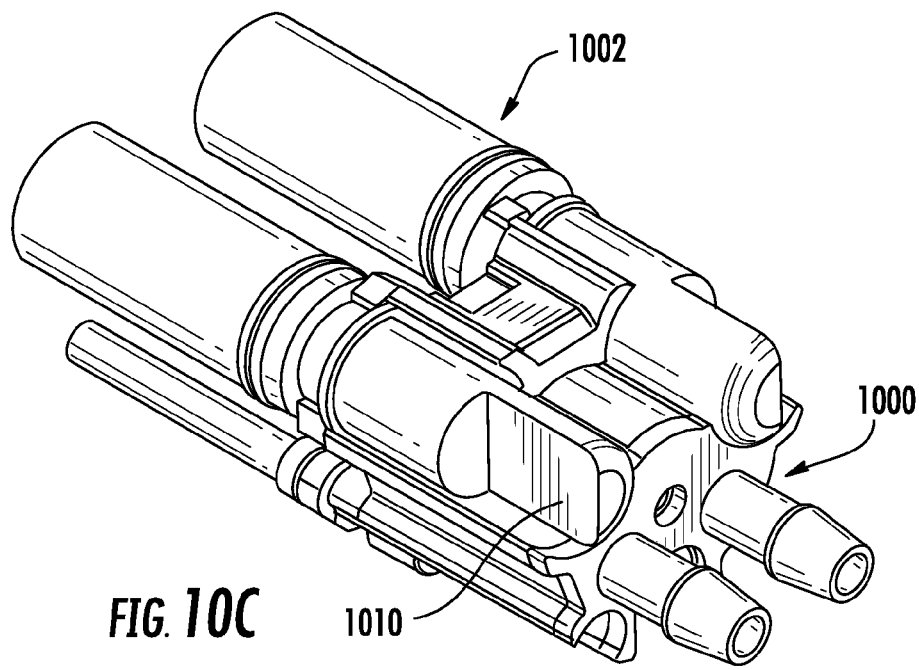

FIG. 10C shows the armature 1000 with the electrical contacts 1002 in place. In some implementations, the larger-diameter contacts are used to supply electric power, for example to an energy storage such as a battery pack. For example, each contact can be provided with a connection surface 1010, such as a flattened area, configured for use in attaching a conductor, such as by welding or crimping. One or more smaller-diameter contacts 1011 can be used for other purposes, including, but not limited to, as a ground terminal or for communication.

Figure 10D:
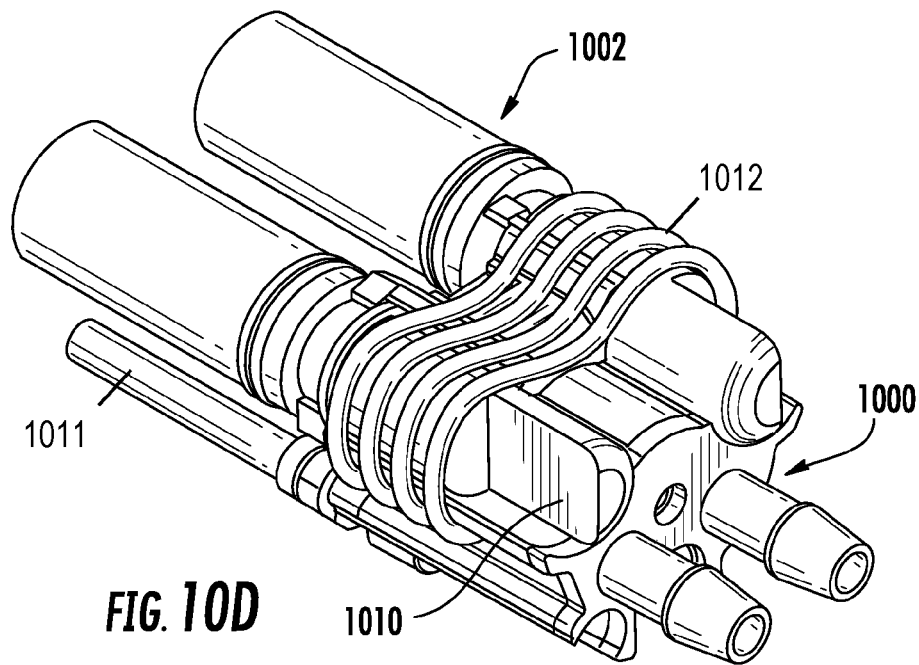

Referring now specifically to FIG. 10D, it shows the armature 1000, the electrical contacts 1002 and the connection surface 1010, here also with one or more fluid channels 1012 that surround at least part of the electrical contacts. The fluid channels are coupled to the fittings of the cap, for example via the hollow interior of the armature, to provide fluid flow. That is, fluid that is provided to the armature can also, or instead, be circulated around the electrical contacts by way of the fluid channels. In some implementations, the fluid channels provide an essentially spiral-shaped flow pattern that makes a number of laps (e.g., four) around at least part of the electrical contacts. For example, this can increase cooling, such as to reduce the temperature of exterior touch surfaces.

Figure 11:
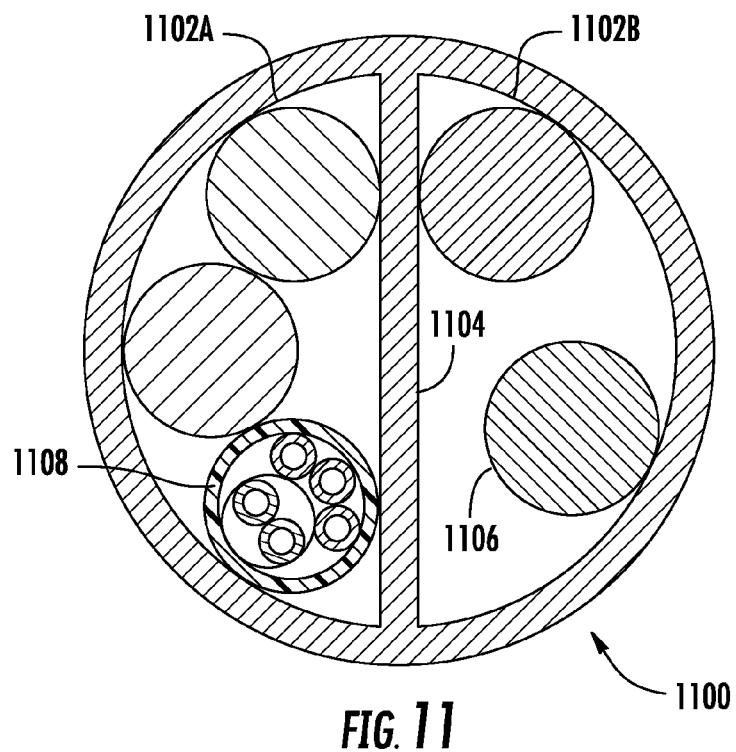
FIGS. 11-12 show other examples of cross section profiles for charging cables.
Figure 12:
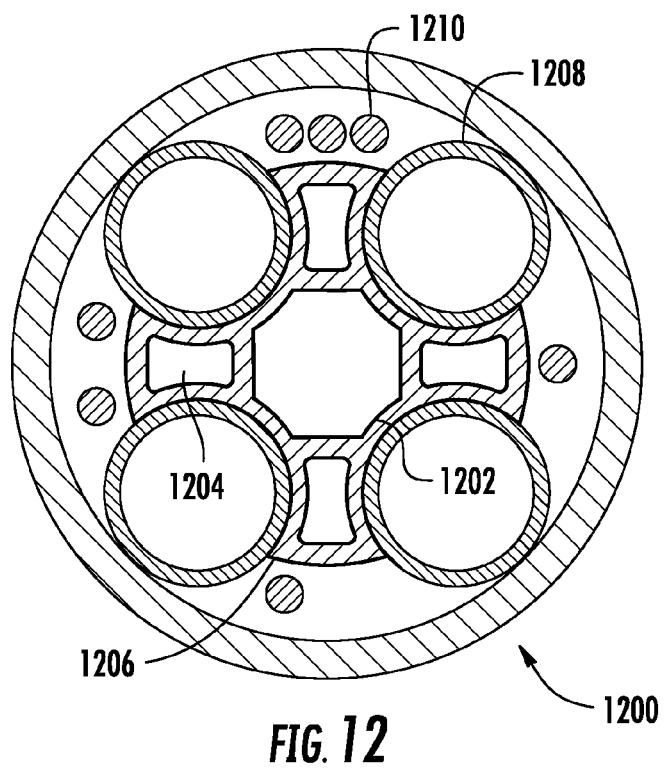

FIGS. 11-12 show other examples of cross section profiles 1100 and 1200 for charging cables. Beginning with the profile 1100, it involves the concept of bi-furcating the inward and outward flows of the fluid (e.g., the coolant). Particularly, the profile 1100 has channels 1102A-B that can be formed by a divider 1104. For example, the channel 1102A can be used for the inward flow (i.e., from the charging equipment toward the connector and the vehicle), and the channels 1102B can be used for the outward flow (i.e., the return flow in the opposite direction). That is, upon reaching the end of the charging cable where the charging connector is attached, the coolant flow can make a return so that it flows back in the opposite channels. Such return can be made in form of a U-turn of the conduit, or by circulating coolant inside an armature, to name just two examples. In other implementations, the inward and outward flows can run in the opposite channels.

Either or both of the channels 1102A-B can have one or more conductors therein. For example, an electric conductor 1106 can supply electric energy for the charging, and a conductor 1108 can provide signaling and/or a ground connection.

Turning now to the profile 1200, it has a central coolant conduit 1202 and multiple radially positioned conduits 1204. The conduits are here formed as integral structures of an extrusion 1206. For example, the extrusion can be formed by extruding a flexible material (e.g., a polymer) or by a cold-casting technique.

The conduits 1202 and 1204 are positioned near or adjacent multiple conductors 1208 and 1210. For example, the conductor 1208 can supply high-voltage AC or DC for the charging, and the conductor 1210 can be ground or a signal cable.

The conduits 1202 and 1204 are coupled to the connector at the end of the charging cable. In some implementations, the connector can serve as a turnaround point for coolant that has flowed in one direction inside the charging cable. For example, the central conduit 1202 can contain coolant flowing towards the equipment being charged (e.g., a vehicle), and the radially positioned conduit(s) 1204 can contain coolant flowing in the reverse direction. In other implementations, coolant can continue through the connector without returning, for example into a coolant reservoir of the vehicle.

Figure 13A:
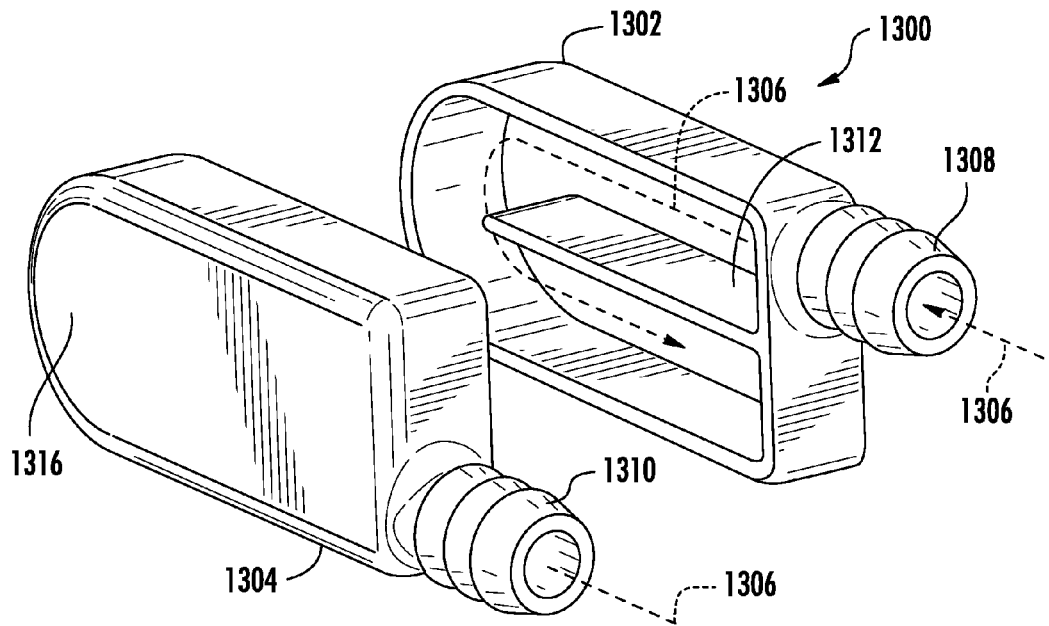
FIGS. 13A-B show an example of a fluid hub.
Figure 13B:
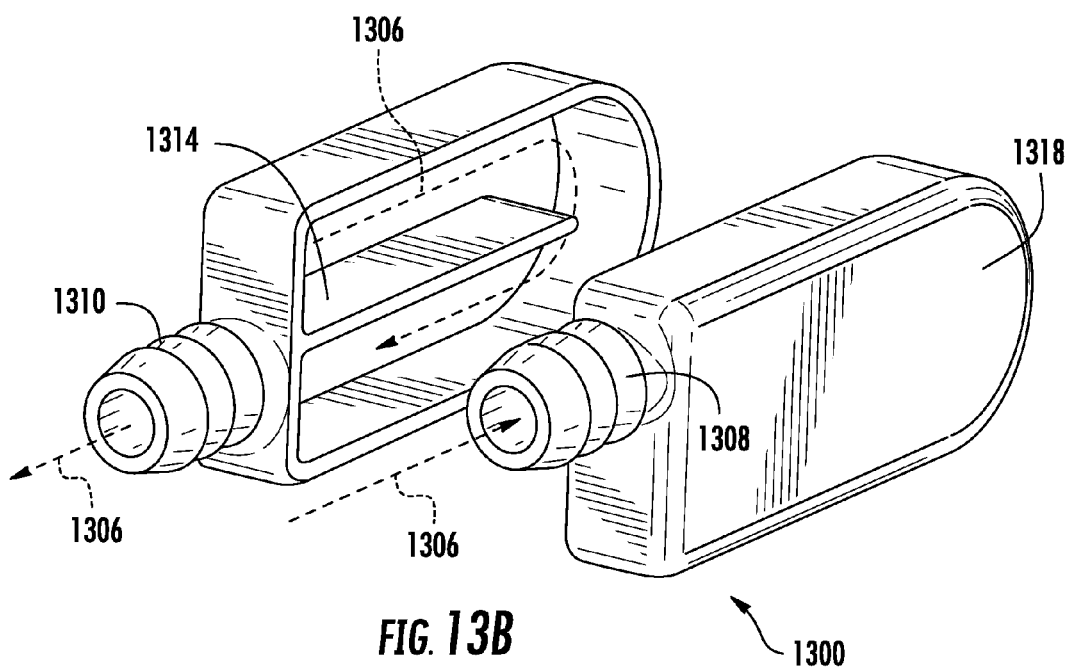

FIGS. 13A-B show an example of a fluid hub 1300. The fluid hub is here shown in an exploded view where a first part 1302 and a second part 1304 are visible. Each of the parts can be manufactured by a molding process, or by a machining process, to name just two examples. When joined together, such as by a snap-fit assembly, welding, or application of adhesive, the fluid hub defines a fluid path 1306 that in this example begins at the first part 1302, where it enters through an opening 1308, continues through an interior of the fluid hub, and reaches the second part 1304, where it exits the fluid hub at an opening 1310. The flow can instead be directed in the opposite direction through the fluid hub.

The fluid hub can have one or more interior walls or other dividers that direct the flow of the liquid. In this example, the first part 1302 has a wall 1312 that divides the interior volume in half, and leaves an open passage at the far end for the fluid to reverse direction. A wall 1314 can be provided in the second part 1304. For example, the walls 1312 and 1314 can form a plane inside the fluid hub. In some implementations, one of the walls can be smaller than the other, or omitted entirely. For example, either of the walls 1312-14 can extend into the opposite part 1302-04 so that the desired flow path for the fluid is defined.

The fluid hub 1300 can provide useful thermal exchange with electric components and/or connectors in a charging system. For example, the fluid hub can present relatively large surface areas 1316 (on the part 1304) and 1318 (on the part 1302) so that a fluid inside the hub cools a component on the outside. Some examples will now be described.

Figure 14:
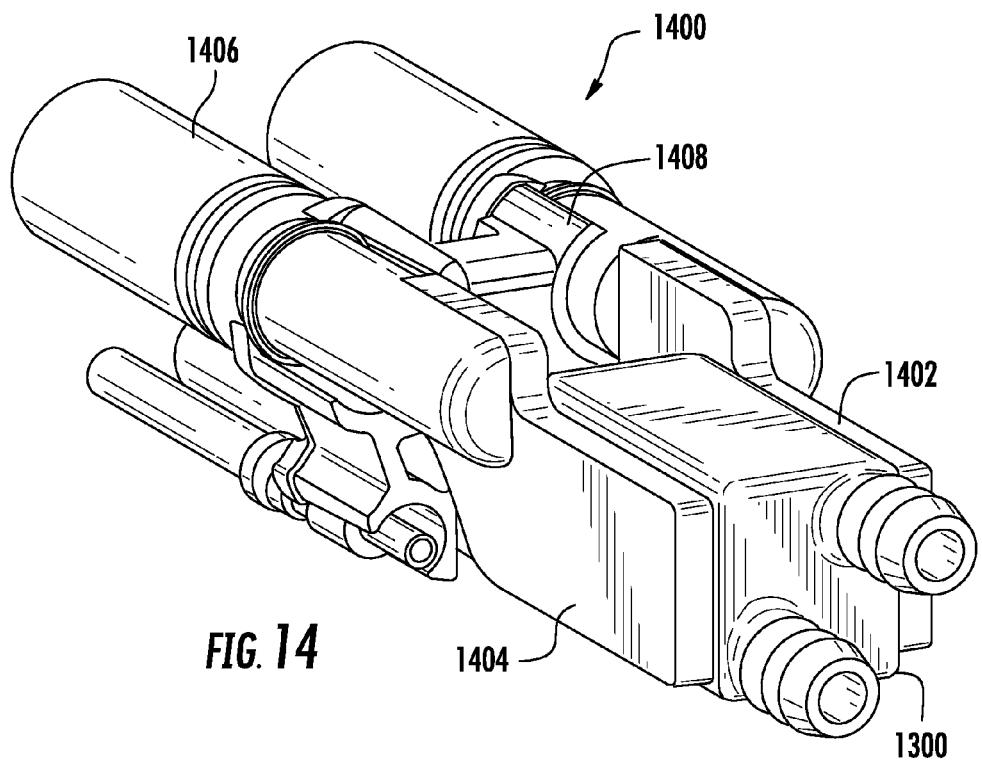
FIG. 14 shows an example of a contact having the fluid hub of FIGS. 13A-B.

FIG. 14 shows an example of a contact 1400 having the fluid hub 1300 of FIGS. 13A-B. The contact has busbars 1402 and 1404 attached on sides of the fluid hub. For example, a thermal epoxy can be used. In this example, the busbars present relatively large surfaces that interface with the fluid hub to provide good thermal exchange.

The busbars are the electrical connection between the rest of the charging cable and one or more contact sockets 1406 or another connector. The contact socket(s) are sized and arranged so as to match the form factor of a charge port of an electric vehicle. The socket(s) can be held by an armature 1408 or other structure.

The contact socket(s) can be brazed to the busbar(s), which can allow a larger thermal transfer area. As another example, the contact socket(s) can be swaged to create an enlarged and/or flattened area for the same function. For example, this can allow fewer parts to be used, and/or removal of another boundary for improved thermal transfer. The conductors of the charging cable can be attached to the busbars by a suitable technique, such as ultrasonic or resistance welding.

Figure 15:
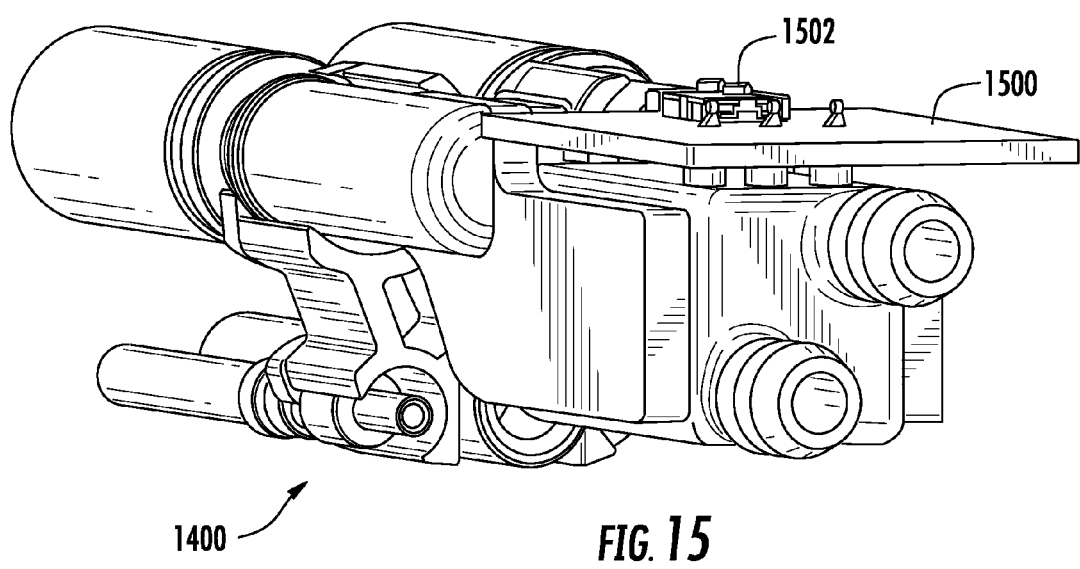
FIG. 15 shows an example of a component mounted on the contact of FIG. 14.

FIG. 15 shows an example of a component 1500 mounted on the contact 1400 of FIG. 14. The component 1500 is involved in the process of charging the electric vehicle, such as in managing flow of electricity and/or coolant, or in communication between the vehicle and the external charging equipment. For example, the component can include one or more circuits created on a printed circuit board.

Positioning the circuitry on the fluid hub can provide useful cooling of such component(s) as well. Also, the architecture of the contact illustrated in this example allows the cable attachment locations—e.g., on the busbars—to be jogged relative to the axis of one or more sockets. This can allow compact packaging of the component 1500 inside the connector handle. That is, the cross-sectional footprint of the socket-end of the assembly can be made smaller.

Figure 16:
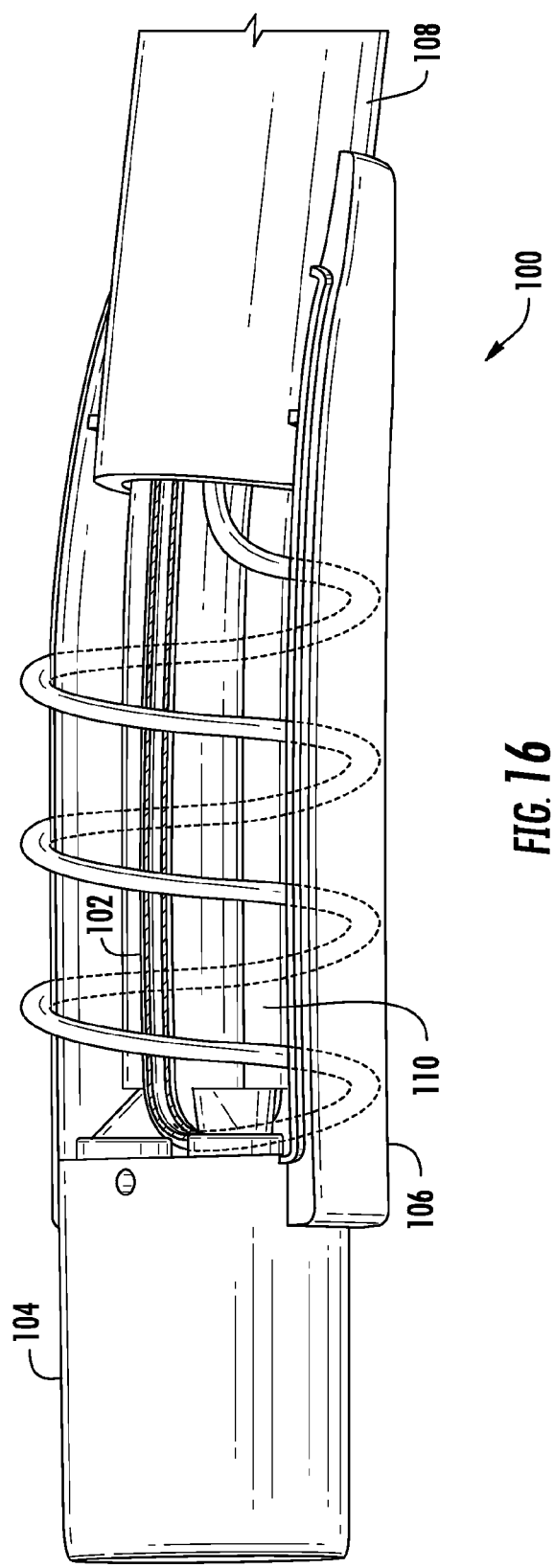
FIG. 16 shows another example of a charging cable having a cooling conduit.

FIG. 16 shows another example of a charging cable having a cooling conduit. The charging cable 100, connector 104, connector housing 106, cable 108 and charging conductor 110 are here similar to those shown in FIG. 1. However, the cooling conduit 102 here leads into a fluid channel 1600 that wraps around inside the handle of the charging connector. The fluid channel may or may not be integrated with the housing of the charging connector. For example, the cooling conduit can run in an inward-facing groove or other space provided by the connector housing 106. As such, from the outside (i.e., to the user) the handle can look similar or identical to another implementation, for example the one in FIG. 1 where the cooling conduit makes a U-turn, or an implementation where the coolant does not return along the same charging cable through which it came. However, the fluid channel can provide one or more advantages, such as improved cooling of the electric contacts and other components, and/or improved temperature management of the external surfaces (e.g., where a user grabs or otherwise touches the equipment).

In this example, a portion 1602 corresponds to where the fluid channel 1600 returns into the charging cable 108 so as to complete the circuit of fluid flow. In other implementations, the fluid can flow in the opposite direction.

A number of implementations have been described as examples. Nevertheless, other implementations are covered by the following claims.

What is claimed is:

1. A charging system for an electric vehicle, the charging system comprising:
   a power supply;
   a cable having a first end and a second end, the first end attached to the power supply, the cable comprising a charging conductor and a cooling conduit, each of which extends from the first end to the second end; and
   a connector attached to the second end of the cable, the connector having a form factor corresponding to a charge port of the electric vehicle, wherein the connector includes a fluid hub that has an inlet opening and an outlet opening;
   wherein the cooling conduit is adapted to convey a fluid that cools the charging conductor and the connector.

2. The charging system of claim 1, wherein the connector further includes contacts for electrical connection to the electric vehicle, and wherein the contacts are held by the fluid hub.

3. The charging system of claim 2, wherein the contacts are essentially cylindrical, and wherein the fluid hub is shaped to receive and hold the contacts.

4. The charging system of claim 1, wherein the fluid hub comprises a housing configured to be closed by a cap.

5. The charging system of claim 4, wherein the inlet opening and the outlet opening are positioned on the cap.

6. The charging system of claim 1, wherein the connector further includes contacts for electrical connection to the electric vehicle, and a fluid channel that surrounds at least part of the contacts.

7. The charging system of claim 6, wherein the fluid channel is coupled to the fluid hub.

8. The charging system of claim 7, wherein a coupling of the fluid channel is done via an interior of the fluid hub.

9. The charging system of claim 6, wherein the fluid channel defines a spiral shaped flow pattern.

10. The charging system of claim 1, wherein the connector further includes contacts for electrical connection to the electric vehicle, the contacts having corresponding busbars, and wherein each of the busbars is positioned against a substantially flat face of the fluid hub.

11. The charging system of claim 10, wherein each busbar of the busbars is jogged relative to a corresponding contact of the contacts.

12. The charging system of claim 1, wherein the fluid hub defines a single interior fluid path from the inlet opening to the outlet opening.

13. The charging system of claim 12, wherein the single interior fluid path makes a U-turn between the inlet opening and the outlet opening.

14. The charging system of claim 1, wherein the fluid hub comprises two halves attached to each other.

15. The charging system of claim 14, wherein each of the inlet opening and the outlet opening is positioned on a respective one of the two halves.

16. The charging system of claim 14, wherein a wall enclosed within an interior of the fluid hub defines an interior fluid path from the inlet opening to the outlet opening.

17. The charging system of claim 16, wherein the wall is formed by corresponding pieces on the respective one of the two halves.

18. The charging system of claim 1, wherein the inlet opening and the outlet opening are staggered from each other horizontally and vertically on a common face of the fluid hub.

19. The charging system of claim 1, further comprising circuit components mounted onto the fluid hub.

20. The charging system of claim 1, further comprising a ground cable that extends from the first end to the second end and is touching the charging conductor and the cooling conduit, wherein the ground cable is adapted to conduct heat from the charging conductor to the cooling conduit.

* * * * *